W. T. CALDERWOOD.
MACHINE RELATING TO THE MANUFACTURE AND MOLDING OF SOAP.
APPLICATION FILED MAR. 10, 1921.

1,409,925.

Patented Mar. 21, 1922.

INVENTOR.
W. T. Calderwood.

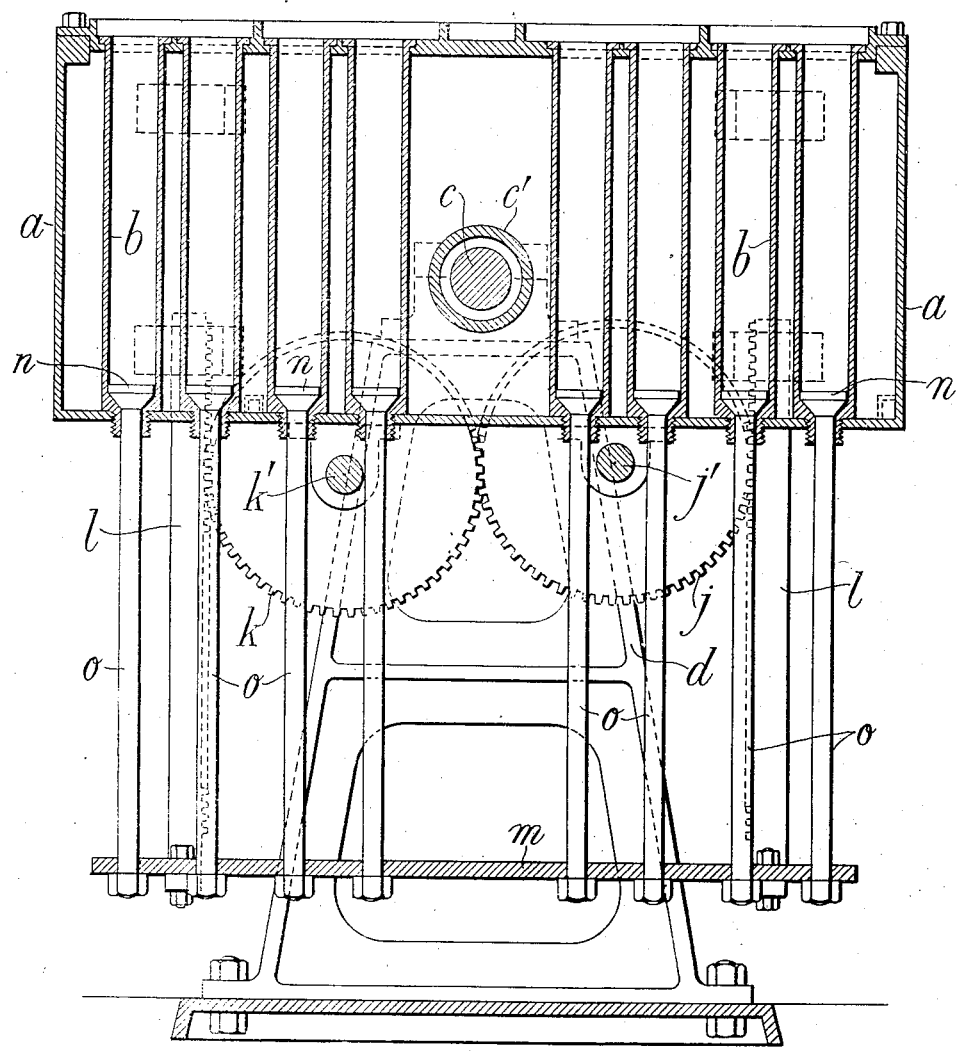

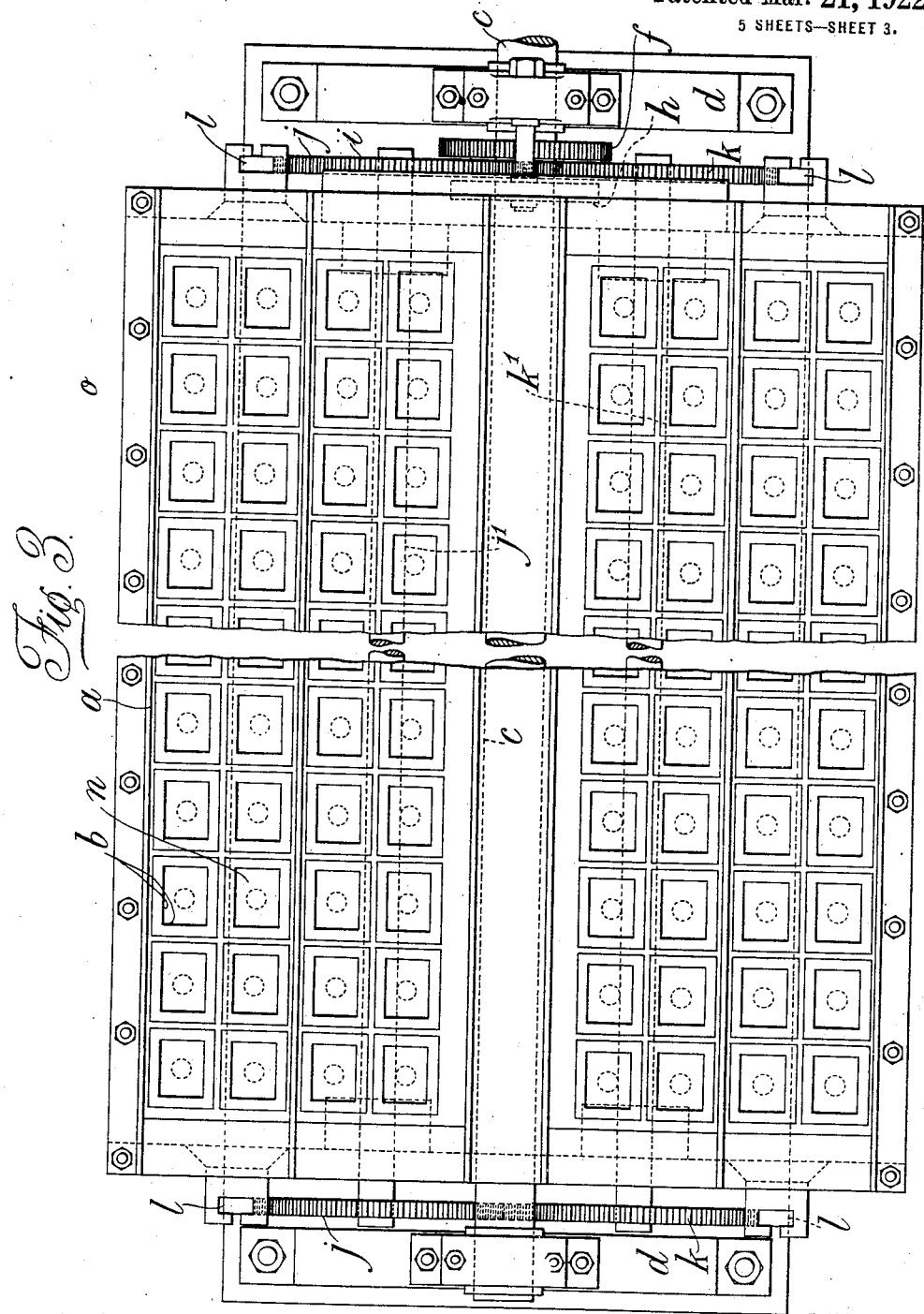

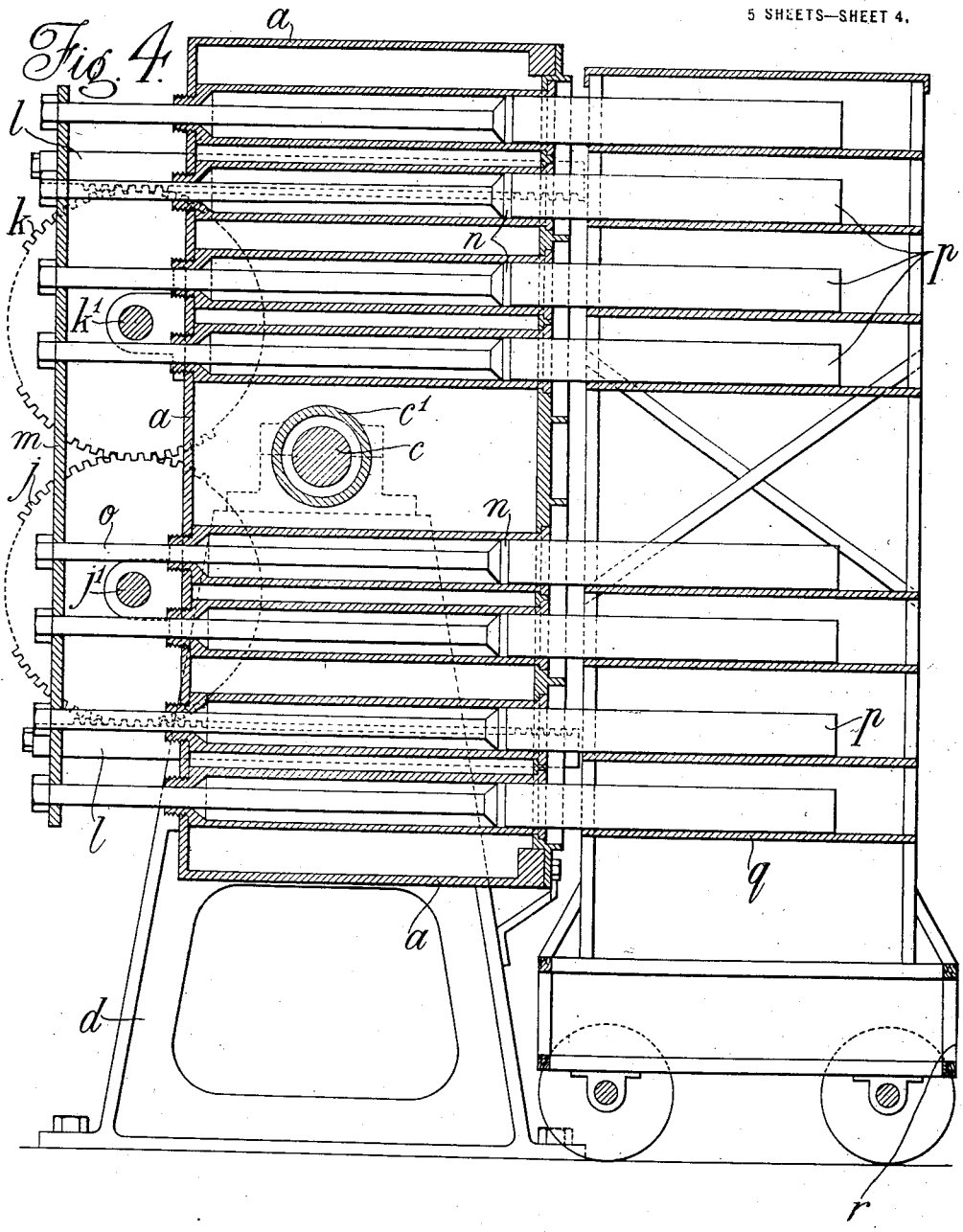

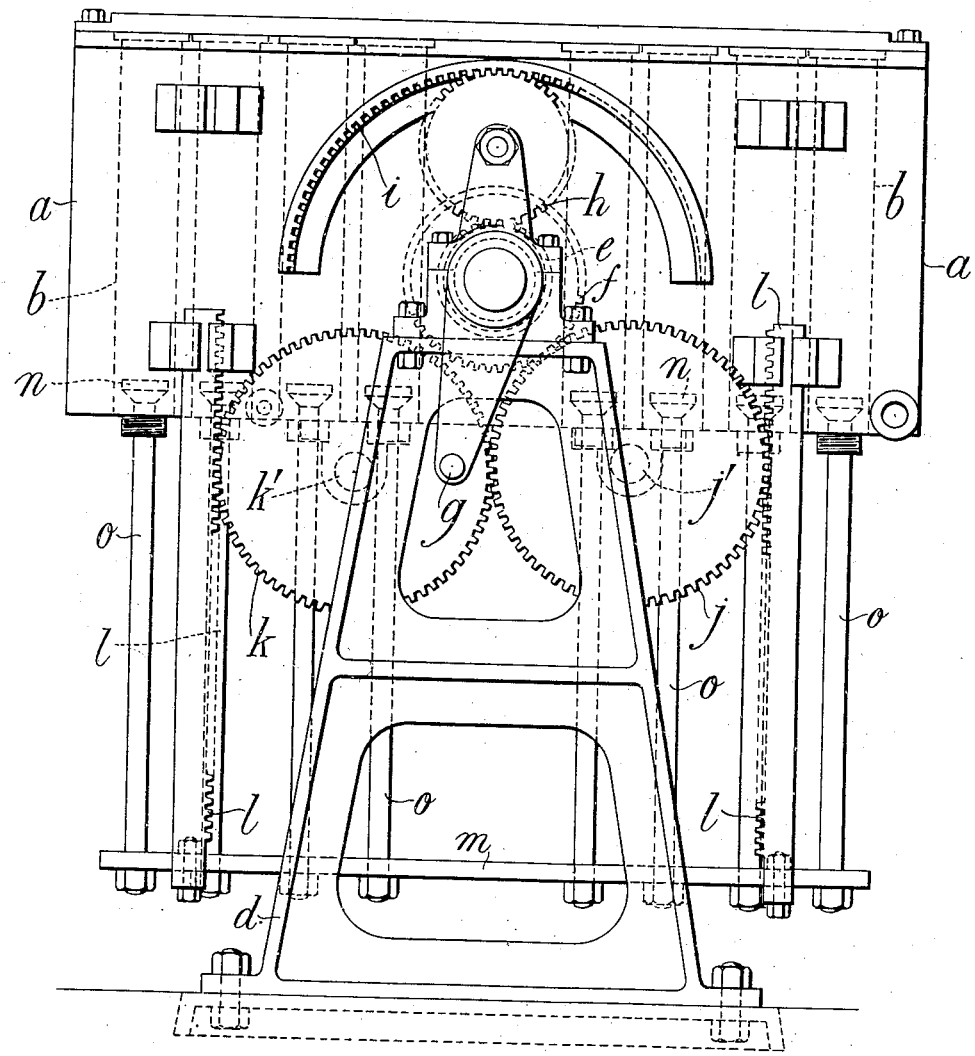

UNITED STATES PATENT OFFICE.

WILLIAM THOMAS CALDERWOOD, OF HUDDERSFIELD, ENGLAND.

MACHINE RELATING TO THE MANUFACTURE AND MOLDING OF SOAP.

1,409,925. Specification of Letters Patent. Patented Mar. 21, 1922.

Application filed March 10, 1921. Serial No. 451,176.

*To all whom it may concern:*

Be it known that I, WILLIAM THOMAS CALDERWOOD, a British subject, and resident of Huddersfield, in the county of York, in the Kingdom of England, have invented certain new and useful Improvements in Machines Relating to the Manufacture and Molding of Soap, of which the following is a specification.

This invention refers to improvements in machines relating to the manufacture and molding of soap, and is applicable to the manufacture of soap in bars of various sections slabs or tablets with plain, stamped or otherwise marked surfaces.

The object of the invention is to reduce the cost of manufacture and improve the quality of the product.

Heretofore it has been customary commercial practice to prepare bars of soap by cutting the same from slabs by means of a bar cutting machine, entailing a considerable amount of labour in handling, excessive waste of material and great loss of time, due to the cooling of the soap in large soap frames before cutting same into slabs.

Machines have heretofore been designed for molding soap, but according to this invention, and in order to overcome the loss in labour, waste and time besides improving the product the soap is run in liquid form straight from the soap pans or soap crutchers into an improved machine, capable of being warmed by steam, hot water, air or any other method while the soap is being run, also when required cooled by water, brine, air or any other method. Such a machine is constructed with a number of molds of the section and size usual in the trade. The machine follows somewhat on the lines of candle molding machines, except that the jacket chamber is entirely enclosed, enabling the steam, water or hot air used in the heating or cooling operations to be under pressure. The operating part of the machine described may be mounted on trunnions, longitudinal rotating shaft or pivots.

In order to eject the molded soap from the machine, it is proposed by this invention to so construct the machine, that when the soap is sufficiently cooled the main body may be revolved about a longitudinal axis to any suitable angle from a vertical to a horizontal position by means of a pinion gearing into a quadrant, levers or other suitable mechanism.

Provision may be made for such machines to work in series with automatic arrangements, enabling the liquid soap to flow continuously without interruption for cooling or cleaning the molds. The machines might in such cases be arranged in circular groups fed from a central supply or arranged on a revolving platform.

In order that the present invention may be clearly understood and more readily carried into effect one application is hereinafter described with reference to the accompanying drawings in which:—

Figure 2 is a sectional end elevation of said machine;

Figure 3 is a plan view thereof;

Figure 4 is a sectional end elevation of the machine with the body in its ejection position and discharging bars of soap on to a travelling trolley; and Figure 5 is an outside end elevation of the machine showing the operating gear.

Figure 1:
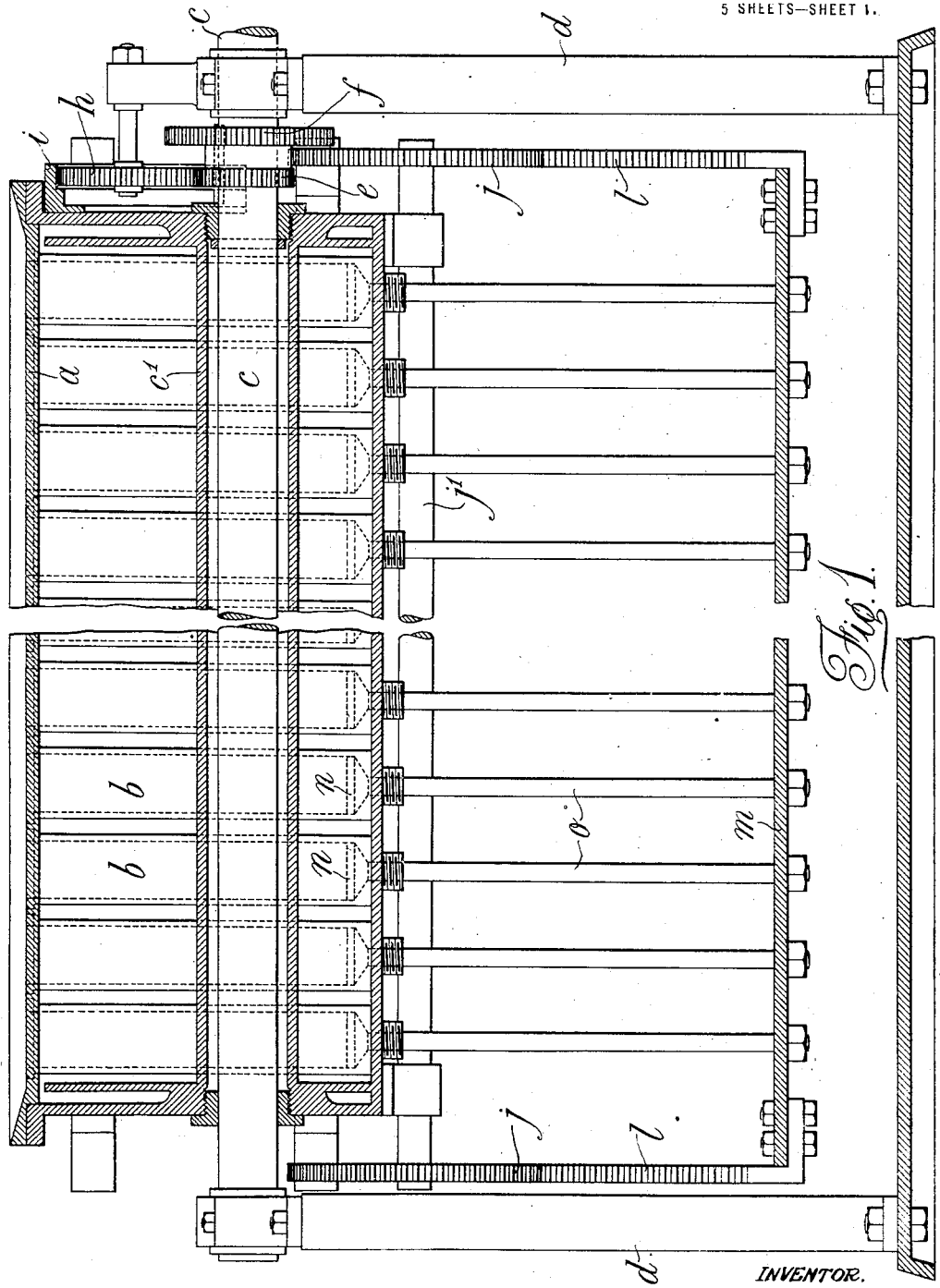
Figure 1 is a sectional side elevation of a machine showing the water box and molds.

As shown and referring to the drawings the sealed body or jacket chamber $a$ containing the molds $b$ is mounted on a horizontal trunnion or operating shaft $c$ which passes through a hollow core $c'$ in the water box and is supported in suitable standards or frames $d$ so that by means of suitable mechanism it can be turned from the normal or vertical position shown in Figures 2 and 5 to the horizontal or preferred ejection position shown in Figure 4. The bars could, however, be ejected vertically if desired. This movement is effected by means of a double pinion $e$ $f$ which is slidably keyed to the shaft $c$ and is moved thereon as desired by an operating arm or any other suitable mechanism not shown. The trunnion or operating shaft $c$ is adapted to be turned by suitable means such as by a crank handle $g$ and the arrangement is such that when the gear wheel $e$ is in the position shown in Figure 1 in engagement with an intermediate spur wheel $h$ which latter also gears with a quadrant or section $i$ the water box $a$ and molds $b$ can be turned through an angle of 90 degrees into a horizontal or discharging position on one side or the other as desired.

After the soap has been run into the molds $b$ which are fitted to the chamber $a$ and are heated by admitting air, water, steam or electricity and then cooled by air, water or brine and after the turning operation from a vertical to a horizontal position has been completed, the pinion $f$ on the shaft $c$ referred to is then thrown into gear with one $j$ of a pair of wheels $j$ $k$ operating racks $l$ connected to a table $m$ to which a number of pistons $n$ from the various molds $b$ are attached by means of rods $o$. The movement of the table $m$ ejects the bars of soap $p$ from the molds $b$ direct on to a series of trays $q$ carried either by a travelling trolley such as $r$ or a frame fixed to the machine so that the bars of soap $p$ are delivered ready for packing or stamping, without handling, from the time the liquid soap leaves the soap pans or soap crutchers. When the soap has been delivered in this manner, the main body of the machine $a$ is returned to the vertical position, re-filled, and the operation is continued. The wheels $j$ and $k$ are mounted on longitudinal shafts $j'$ and $k'$ and are duplicated at each end of the machine as are also the racks $l$ with which they engage.

The molds may be formed with external fins or ribs to facilitate heating or cooling, and the chambers, jackets or pipes may be fitted with baffles, diaphragms or retarders to facilitate circulation and thus promote the heating or cooling processes.

It will be seen that as the steam, air, and water are admitted to a closed space in the jacket chamber they can be used under pressure if desired.

Provision may also be made for cleaning or scavenging the molds between the charges, by mechanical process, compressed air or steam jets.

Provision is also made by modification of the arrangement described to charge or supply the soap liquid to the molds from the bottom to eject air and prevent same from blistering the soap bar surfaces through sealed air-bubbles.

Further the molds may be so constructed that by a suitable locking device they can be readily opened longitudinally for ejecting the soap tablets or bars.

The gearing may be arranged for hand or power operation as required.

Bars of soap molded and cooled in their molds, in the manner described are not liable to warp in the same manner as bars cut from slabs, owing to the fact that they are suddenly and evenly cooled throughout, and furthermore there is not the same loss in evaporation or weight as with bars cut from slabs, owing to the molded bars being delivered from the molds with a naturally formed protective skin.

Further it will be appreciated that the bars having such a protective skin will not stick to the papers in which they are usually wrapped; they also have a uniform colour and glossy finish owing to the aforesaid sudden cooling.

What I claim is:—

1. A soap-molding machine comprising a horizontal shaft, a jacketed mold having one open end carried by said shaft and normally supported with its open end uppermost, an ejector fitted in and carried by the mold, means on said shaft for turning the mold and bringing the open end thereof to a discharging position, and means on said shaft to drive the ejector through the mold to the open end thereof in the delivery position.

2. In a soap-molding machine, the combination of a horizontally disposed shaft, a sealed box carried by said shaft, a plurality of molds contained within the box and normally in a vertical position with their upper ends open, a table normally below the box, a plurality of ejectors carried by said table and fitted in the several molds, means on the shaft for turning the same and bringing the box and the molds into a delivery position, and means operatively connecting the shaft with the table whereby to move the ejectors through the molds toward the open ends thereof in the delivery position of the molds.

3. In a soap-molding machine, the combination of a horizontally disposed shaft, gears slidably mounted thereon and constrained to rotate therewith, a sealed box carried by said shaft, a plurality of molds within said box, a rack on the box, a gear meshing with said rack and adapted to be engaged by one of the gears upon the horizontal shaft whereby to turn the box and the molds therein from a vertical to a horizontal position and vice versa, a plurality of plungers fitted respectively in the molds, and means operatively connected with said plungers and adapted to be actuated by the other gear upon the horizontal shaft for moving the plungers through the molds in the horizontal position of the molds.

4. In a soap-molding machine, the combination of a horizontally disposed shaft, a box carried by said shaft, a plurality of molds within said box, the box being normally in position to maintain the molds upright to receive the liquid soap, a table normally below the box, a plurality of ejectors carried by said table and fitted in the respective molds, racks rising from said table, gears carried by the box and meshing with said racks, means on the horizontal shaft for rotating said gears whereby to move the ejectors through the molds, and means carried by said shaft for turning the box and the molds from a vertical to a horizontal position.

5. A soap-molding machine comprising a box, a plurality of molds within the box, the box with the molds being mounted for pivotal movement in a vertical plane, a plurality of ejectors, means for moving the ejectors through the molds when the molds are in a horizontal position, and a plurality of trays arranged to aline with the respective molds in the horizontal position of the latter whereby to receive the material forced from the molds by the ejectors.

In testimony whereof I hereunto sign my name.

WILLIAM THOMAS CALDERWOOD.